(No Model.) 2 Sheets—Sheet 2.

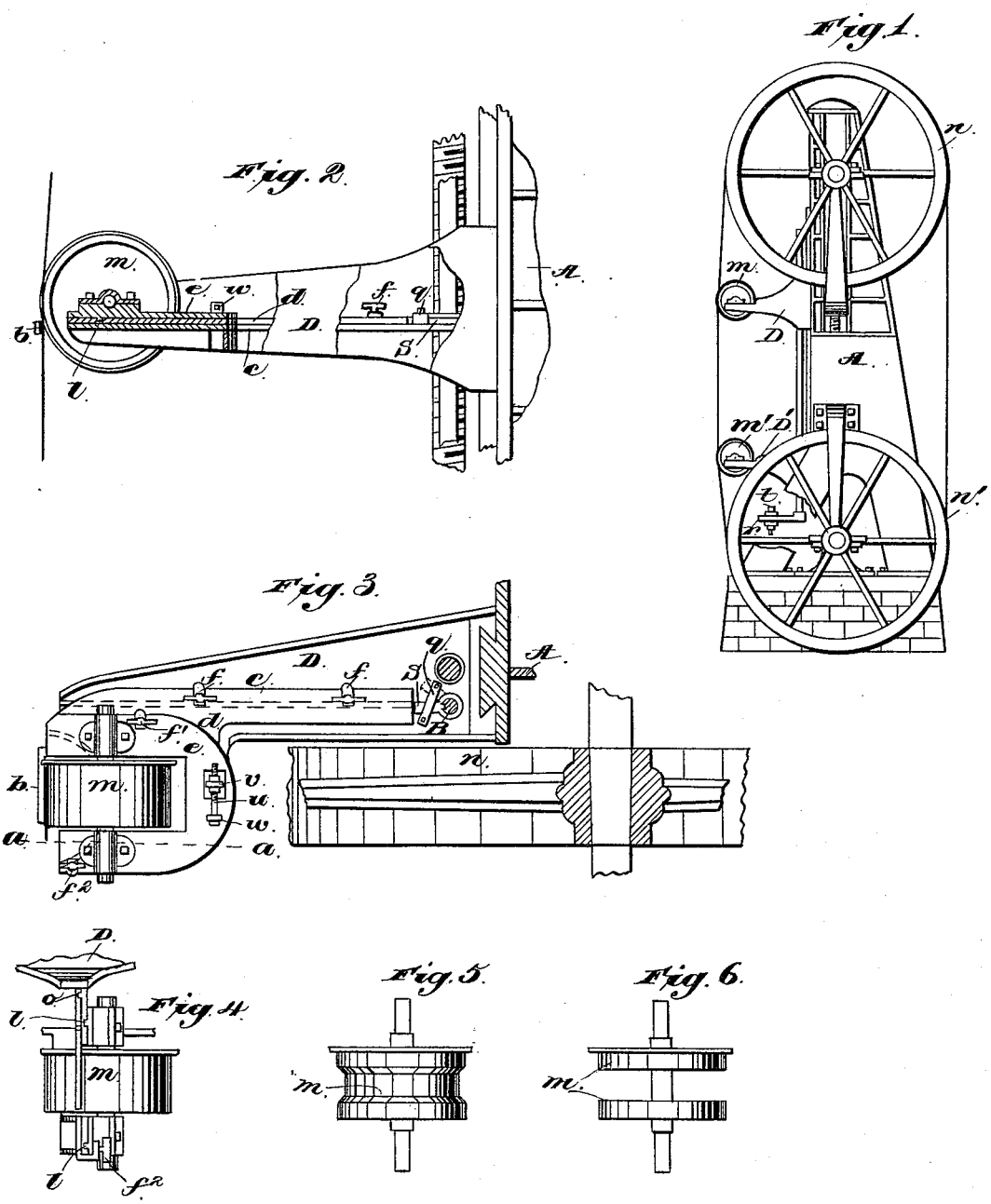

D. K. ALLINGTON.
BAND SAW MILL.

No. 337,913. Patented Mar. 16, 1886.

Witnesses:
Charles S. Hyer
Edward L. Mills

Inventor:
David K. Allington
By Crumarble
Atty.

UNITED STATES PATENT OFFICE.

DAVID K. ALLINGTON, OF EAST SAGINAW, MICHIGAN.

BAND-SAW MILL.

SPECIFICATION forming part of Letters Patent No. 337,913, dated March 16, 1886.

Application filed January 11, 1886. Serial No. 188,219. (No model.)

*To all whom it may concern:*

Be it known that I, DAVID K. ALLINGTON, a citizen of the United States, residing at East Saginaw, in the county of Saginaw, State of Michigan, have invented certain new and useful Improvements in Saw-Guides, of which the following is a specification, reference being had therein to the accompanying drawings.

My invention relates to band sawing machines, and more particularly to means for guiding the saw and adjusting it so as to make a true cut.

The object of my invention is to construct a guide for a band-saw which will take the vibration out of the saw as it leaves the upper saw-wheel, will permit the saw to be moved back away from the cut just made and returned to its former position while preparing for the next cut without liability of changing the line of the cut, and which can be easily and conveniently adjusted to the true line of cut whenever necessary.

The general construction of the machine by which these objects are accomplished may be briefly stated, as follows: The saw runs as usual upon an upper and a lower saw-wheel journaled in a supporting-column. The saw-guides which project from the column are two loose wheels, placed one above the other, which are revolved by contact with the saw, and at the same speed as the latter. The guide-wheels, however, when the saw is in operation, project so far beyond a vertical line tangent to both saw-wheels that the saw above and below the guides is deflected to some extent from the vertical, while it is always vertical between the two guide-wheels where the cut is made. The elasticity of the saw keeps it in contact with the guide-wheels, while the consequent friction is taken up by the free revolution of the latter. The guide-wheels are capable of two horizontal adjustments—one a sliding movement toward and away from the column, the other a partial rotary movement relatively to the plane of the saw-wheels. The support for the upper guide is also vertically adjustable on the column when it is desired to change the distance between the guides.

For a more perfect knowledge of my invention and of the details of construction in the machine embodying it, reference must be made to the following detailed description, and to the accompanying drawings, in which—

Figure 7:
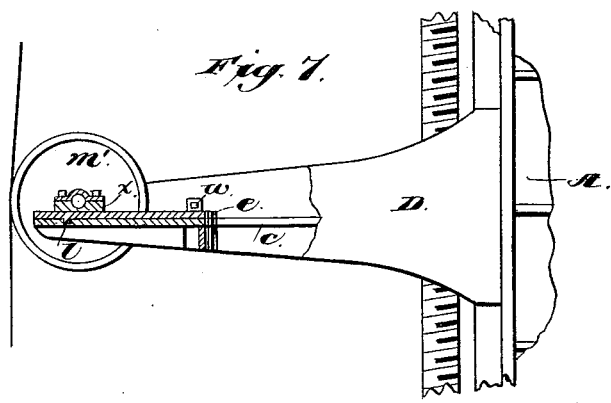
Figure 8:
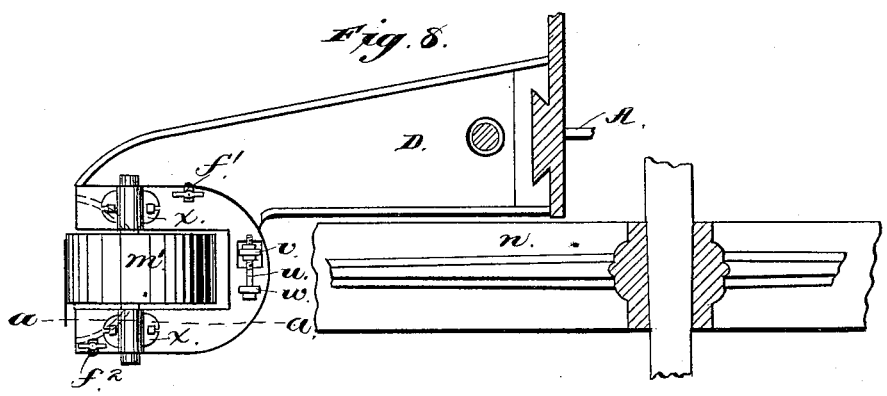
Figures 9, 10, 11:
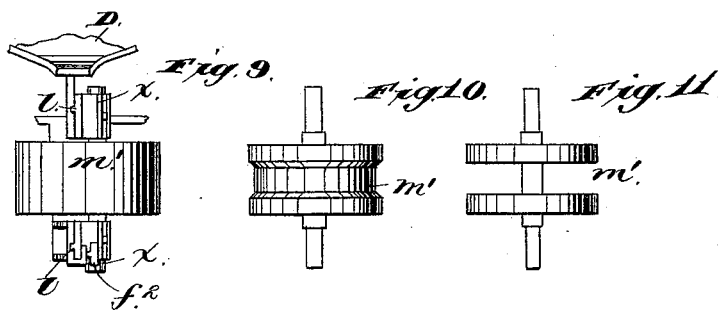

Figure 1 is a side elevation of the entire machine. Fig. 2 is a side view, partly in section and partly in elevation, of the upper or adjustable guide-arm. Fig. 3 is a plan view of the upper guide-arm, showing the upper saw-wheel partly broken away in section and in its relative position. Fig. 4 is an end view of the upper guide-arm. Figs. 5 and 6 represent different forms of guide-wheels. Figs. 7, 8, and 9 are views similar to Figs. 2, 3, and 4, but illustrating a modified form of the machine. Figs. 10 and 11 also represent forms of guide-wheels.

A represents a vertical supporting-column bolted to any suitable base. The saw-wheels $n$ $n'$ are journaled in the column and driven by power applied in any suitable manner. (Not shown.) These wheels carry the endless band-saw, Fig. 1. Connected to the column are two projecting guide-arms, D D', which support the guide-wheels $m$ $m'$, Fig. 1. The upper arm, D, is vertically adjustable in the column, as hereinafter described, so that the space between the guide-wheels may be regulated, and both arms project out from the column to such an extent that the guide-wheels journaled in them extend beyond the saw-wheels $n$ $n'$. The band-saw passes over both the guide-wheels, and is thus held in a vertical position from one guide-wheel to the other between which the cutting is done. The natural tendency of the saw to spring back to a vertical position holds it in close contact with the guide-wheels.

The manner of setting and adjusting the guide-wheels will now be described. The guide-arm D has formed with it a flat plate, $c$, Figs. 2 and 3, which is cut away, as shown, to admit the guide-wheel $m$. Upon this plate is mounted a sliding plate, $d$, also cut away to admit the wheel, and connected to plate $c$ by means of a tongue and groove, $o$, Fig. 4, so as to slide freely thereon. A semicircular groove is formed on the upper side of the plate $d$, (see Fig. 4, and dotted lines, Fig. 3,) the center of the circle being at about the middle of the width of the saw when in place. The wheel is journaled in boxes carried by an upper plate, $e$, which also has a circular fillet, $l$, to engage with the circular groove in the plate $d$, so that it may be turned to change the angle of the wheel. This adjustment is accomplished by means of a standard, *v*, on the plate *d*, which projects up through a slot in the plate *e* and receives the adjusting-bolt *u*, Fig. 3, which carries nuts, by means of which the turning of plate *e* and the guiding-wheel is accomplished. When the proper adjustment has been made, the plates *d* and *e* are clamped together by means of a lug, *f'*, Fig. 3, on the plate *d*, which projects over the edge of the plate *e*, through which passes a thumb-screw which bears upon the plate *e* and holds it firmly. The outer edge of the plate *e* is held in place by a lug, *f²*, rigidly attached to the lower plate, *c*, which projects over the edge of plate *e*. It thus holds all three plates together, and the thumb-screw which passes through it bears upon the plate *e*, and permits the plate *d* to slide freely, carrying with it the plate *e*. The plates *c* and *d* are held together in a similar manner by lugs *f*, having thumb-screws, as shown in Figs. 2 and 3. The plates *d* and *e* being clamped together when the saw is in operation, it will be seen that by moving the plate *d* in the groove in plate *c* the guide-wheel will be moved inward toward the column. This movement of the plate *d* is caused, when desired, by the tendency of the saw to straighten, and it is therefore necessary to provide means for holding the plate *d* stationary, and for forcing it and the guide-wheels outward again. The plate *d* has a long extension which projects back toward the column in proximity to the vertical adjusting-shaft B, passing through the arm D. Upon the shaft is attached, by means of a feather and groove, an arm, *s*, Fig. 3, which is operated by the turning of the shaft, so as to strike the extended plate *d*, force it outward, and hold it, as shown in full lines in Fig. 3. The plate *d* will spring back when the arm *s* assumes the position of dotted lines in same figure. The result of this is to remove the saw from the line of cut while the log is being prepared for the next cut. The shaft B is then turned back, forcing the plate *d* and the guide-wheel outward, causing the saw to assume the position shown in Fig. 1. The adjusting-arm *s* is held in place on the upper guide-arm by a cap, *q*, Fig. 3, and, being secured to the shaft by a feather-and-groove connection, permits the arm D to be moved readily up and down. As above mentioned, the shaft B is journaled in the upper and lower guide-arms, and is operated by a horizontal projecting lever secured to its lower end, having a bar, *t*, connected to it, and carrying any suitable form of lever, convenient to the operator's reach. The guide-arm is fitted to and slides vertically upon a plate secured to the column A, a dovetail joint being preferably used, as shown in Fig. 3. It is moved up and down, as required, by a screw-shaft operated by bevel or worm gearing, like that, for instance, described in my application for Letters Patent filed October 26, 1885, Serial No. 180,916. The lower guide-arm, D', is constructed like the arm D in nearly all respects. As it is fixed rigidly to the column, however, no provision is necessary for the sliding of the arm *s* on shaft B, and so the arm may be fixed upon the shaft and the cap *q* dispensed with. Both guides act simultaneously, always keeping the saw in a perpendicular line between them. The plate *d* is provided with a guard, *b*, which extends in front of the guide-wheel and saw as a precaution in case of its breaking. The plate *c* is cut away to allow this guard to move back and forth with the guide-wheel *m*.

Figs. 7, 8, and 9 represent a modified form of the machine which is substantially like that already described, with the exception that no provision is made for the horizontal movement of the guide-wheels to and from the column. The sliding plate *d* is dispensed with and the plate *e*, which carries the journal-boxes for the guide-wheels, is mounted directly upon the plate *c*, the boxes *x x*, Fig. 8, being made adjustable by means of slots and bolts. The position of the guide-wheels in this form of construction is such, however, that the saw is constantly deflected from the perpendicular, its resiliency keeping it in contact with the guide-wheel. The provision for the partial rotary movement of the plate *e*, and consequent adjustment of the guide-wheel, is the same as that described in connection with the other form of machine.

In Figs. 5 and 6 and Figs. 10 and 11 are shown several different forms of guide-wheels with and without side flanges, any of which may be substituted for those shown in the main figures of the drawings. These wheels may be constructed of any suitable material and covered with any suitable material to reduce friction.

It is obvious that many minor details in the construction of the parts could be made and substituted for those shown and described without departing from the spirit of my invention.

Having thus described my invention, what I claim as new, and desire to secure by Letters Patent, is—

1. In a band sawing machine, the combination of a supporting-column, a pair of saw-wheels carrying an endless band-saw, and a pair of guide-wheels in contact with and revolved by the saw, such guide-wheels extending beyond the main saw-wheels, so as to deflect the saw from the perpendicular, substantially as and for the purposes set forth.

2. In a band sawing machine, the combination of a supporting-column carrying saw-wheels and an endless saw, and upper and lower guide-arms carrying adjustable guide-wheels, such guide-wheels projecting beyond a vertical line drawn tangent to the main saw-wheels, one of the guide-arms being vertically adjustable on the column, substantially as and for the purposes set forth.

3. In a band sawing machine, the combination of a supporting-column, upper and lower saw-wheels carrying an endless band-saw, and upper and lower guide-arms carrying guide-wheels in contact with the saw, such guide-wheels being movable toward and from the column, substantially as described, and for the purposes set forth.

4. In a band sawing machine, the combination, with a supporting-column and with saw-wheels carrying an endless band-saw, of guide-arms and guide-wheels journaled therein, such guide-wheels being adjustable toward and from the column and also adjustable horizontally relatively to the plane of the guide-arms, substantially as described, and for the purposes set forth.

5. The combination, with the guide-arms D D', having the horizontal plate $c$, of the sliding plate $d$, the plate $e$, having a partial rotary motion and supporting the guide-wheels, and means for forcing the plate $d$ outward from the column and holding it there, substantially as described.

6. The combination of the guide-arms D D', the sliding plate $d$, the plate $e$, carrying the guide-wheels and having a partial rotation, the arm $s$ feathered on the shaft B, so as to be turned to engage with the plate $d$ to control the backward movement thereof, and the vertical shaft B, substantially as described.

7. In a band sawing machine, a saw-guide consisting of an arm adjustable to and from a supporting-column, a friction-wheel, $m$, mounted in the outer end of the saw-arm, and means for adjusting the said friction-wheel $m$ with relation to the saw to set it to a true line of its cut, substantially as described.

8. In a band sawing machine, a lower guide-arm supported on a supporting-column and having a vertical movement only, and a friction-wheel, $m'$, mounted in the outer extended portion, said friction-wheel being adjustable in a semicircular groove, whereby the saw running over the wheel will be adjusted to a true line of its cut, substantially as described.

In testimony whereof I affix my signature in presence of two witnesses.

DAVID K. ALLINGTON.

Witnesses:
F. E. MOORE,
S. C. SLADE.